US009630522B2

(12) United States Patent
Ketfi-Cherif et al.

(10) Patent No.: US 9,630,522 B2
(45) Date of Patent: Apr. 25, 2017

(54) SYSTEM AND METHOD FOR CONTROLLING A MOTOR VEHICLE WITH INDEPENDENT REAR ELECTRIC MACHINES

(71) Applicant: RENAULT s.a.s., Boulogne Billancourt (FR)

(72) Inventors: Ahmed Ketfi-Cherif, Elancourt (FR); Gregory Launay, Paris (FR); Abdelmalek Maloum, Chevilly la Rue (FR); Olivier Scheffges, Clamart (FR); Maxime Debert, Versailles (FR)

(73) Assignee: RENAULT s.a.s., Boulogne Billancourt (FR)

( * ) Notice: Subject to any disclaimer, the term of this patent is extended or adjusted under 35 U.S.C. 154(b) by 0 days.

(21) Appl. No.: 14/647,267

(22) PCT Filed: Nov. 26, 2013

(86) PCT No.: PCT/EP2013/074680
§ 371 (c)(1),
(2) Date: May 26, 2015

(87) PCT Pub. No.: WO2014/080028
PCT Pub. Date: May 30, 2014

(65) Prior Publication Data
US 2015/0291057 A1 Oct. 15, 2015

(30) Foreign Application Priority Data
Nov. 26, 2012 (FR) ...................... 12 61214

(51) Int. Cl.
*G05D 1/00* (2006.01)
*B60L 15/20* (2006.01)
(Continued)

(52) U.S. Cl.
CPC ............... *B60L 15/20* (2013.01); *B60K 6/48* (2013.01); *B60K 6/52* (2013.01); *B60K 28/16* (2013.01);
(Continued)

(58) Field of Classification Search
CPC .. B60L 15/20; B60K 6/48; B60K 6/52; B60K 28/16; B60W 20/10; B60W 30/18172; B60W 30/184
See application file for complete search history.

(56) References Cited

U.S. PATENT DOCUMENTS 6,008,606 A 12/1999 Arai et al.
6,770,005 B2 * 8/2004 Aikawa ................... B60K 1/00
475/231
(Continued)

FOREIGN PATENT DOCUMENTS

EP 1 327 547 7/2003
EP 1 527 928 5/2005
(Continued)

OTHER PUBLICATIONS

International Search Report Issued Apr. 10, 2014, in PCT/EP13/074680 filed Nov. 26, 2013.
(Continued)

*Primary Examiner* — Ian Jen
(74) *Attorney, Agent, or Firm* — Oblon, McClelland, Maier & Neustadt, L.L.P.

(57) ABSTRACT

A method controls a motor vehicle including an internal combustion engine coupled to a first axle set and to at least two electric machines each one coupled to one wheel of a second axle set. The method includes determining the speed of at least one of the electric machines; comparing the determined speed against a threshold; and altering, if the determined speed is above the threshold, the maximum
(Continued)

torque of the electric machines so as to limit the rotational speed of the machines.

11 Claims, 2 Drawing Sheets

(51) Int. Cl.
*B60K 6/52* (2007.10)
*B60K 28/16* (2006.01)
*B60W 30/18* (2012.01)
*B60W 30/184* (2012.01)
*B60K 6/48* (2007.10)
*B60W 20/10* (2016.01)
*B60K 7/00* (2006.01)
*B60K 17/356* (2006.01)

(52) U.S. Cl.
CPC .......... *B60W 20/10* (2013.01); *B60W 30/184* (2013.01); *B60W 30/18172* (2013.01); *B60K 7/0007* (2013.01); *B60K 17/356* (2013.01); *B60K 2007/0092* (2013.01); *B60W 2510/081* (2013.01); *B60W 2520/26* (2013.01); *Y02T 10/6265* (2013.01); *Y02T 10/7258* (2013.01); *Y10S 903/906* (2013.01)

(56) References Cited

U.S. PATENT DOCUMENTS

| | | | | |
|---|---|---|---|---|
| 6,895,175 | B2* | 5/2005 | Fulton | F02N 11/0859 |
| | | | | 123/179.1 |
| 6,962,550 | B2* | 11/2005 | Kadota | B60K 6/44 |
| | | | | 180/65.225 |
| 7,363,995 | B2* | 4/2008 | Downs | B60K 7/0007 |
| | | | | 180/292 |
| 9,033,839 | B2* | 5/2015 | Rossey | B60K 1/00 |
| | | | | 475/150 |
| 2003/0151381 | A1 | 8/2003 | Kadota et al. | |
| 2005/0093496 | A1 | 5/2005 | Tokunou et al. | |
| 2009/0242289 | A1 | 10/2009 | Murty | |
| 2011/0301792 | A1 | 12/2011 | Yamazaki et al. | |
| 2012/0072076 | A1 | 3/2012 | Gustavsson | |

FOREIGN PATENT DOCUMENTS

| | | |
|---|---|---|
| WO | 2009 120463 | 10/2009 |
| WO | 2010 136072 | 12/2010 |

OTHER PUBLICATIONS

French Search Report Issued Sep. 5, 2013 in Application No. FR 1261214 filed Nov. 26, 2012.

\* cited by examiner

SYSTEM AND METHOD FOR CONTROLLING A MOTOR VEHICLE WITH INDEPENDENT REAR ELECTRIC MACHINES

BACKGROUND

The technical field of the invention is the control of hybrid vehicles, more particularly the control of hybrid vehicles having independent rear electric machines.

Hybrid vehicles with in-wheel motors comprise two traction systems and thus offer an additional option to that of all-electric vehicles.

The first traction system in such vehicles is purely electric. It comprises, on the rear axle set, two electric traction machines of the "in-wheel motor" type.

The second traction system is a heat engine propulsion unit made of up a combustion engine and a semiautomatic gearbox.

The vehicle is chiefly intended for electric use in town but also needs to be usable out of town.

Combustion engine operation gives the vehicle additional autonomy and a higher maximum speed as compared with the electric mode.

Electric operation is therefore deliberately limited to a maximum speed, for example of 90 km/h. An uncoupling system allows the electric machines to be disconnected above and beyond this speed. Thus the electric machines can be rated for a sufficient speed range, vehicle losses and therefore energy consumption beyond 90 km/h can be reduced and an additional safety barrier made available to ensure that the driver maintains control of the vehicle should the electric traction system malfunction.

Taking the design of this vehicle into consideration, it is absolutely essential to protect the traction electric machines from a risk of overspeed in operation. To do so, the speed of the electric machines under all nominal conditions of operation is limited, even when a wheel is skidding or no longer touching the ground. This then prevents a wheel from running away. It is also necessary to be able to afford this level of protection both in nominal operation and in the event of a partial or complete malfunctioning of the electric traction system.

The following documents are known from the prior art.

Document US20090033264A1 discloses a standard device for limiting and regulating the speed of a vehicle.

Document WO200735146A1 discloses a device providing speed control of a component of the drivetrain of a motorized vehicle.

Document WO201023998A1 describes a device for regulating and limiting the speed of a motor vehicle.

There therefore remains a need for a control system and method which are able to prevent a risk of electric traction machine overspeed during operation.

BRIEF SUMMARY

One subject of the invention is a method for controlling a motor vehicle comprising an internal combustion engine coupled to a first axle set and having at least two electric machines each coupled to one wheel of a second axle set. The method comprises the following steps:
 the speed of at least one of the electric machines is determined,
 the determined speed is compared against a threshold,
 if the determined speed is above said threshold, the maximum torque of the electric machines is altered so as to limit the rotational speed of said machines.

The speed of the electric machines may be determined from the maximum value of the rotational speeds of the left and right electric machines over a predetermined period of time.

The speed of the electric machines may be determined from measurements of the rotational speeds of the left and right wheels of the second axle set and from the maximum value of the rotational speeds of the left and right wheels over a predetermined period of time.

It may be determined whether the rotational speed of the electric machines is above a first speed threshold;
 if it is, the maximum torque of the electric machines is regulated in order to limit their rotational speed.

Alternatively, if the rotational speed of the electric machines is above a second speed threshold higher than the first threshold, a zero maximum torque instruction is issued to the electric machines.

The first axle set may be the front axle set; the second axle set may be the rear axle set.

Another subject of the invention is a system for controlling a motor vehicle comprising an internal combustion engine coupled to a first axle set and at least two electric machines each coupled to one wheel of the second axle set, the control system being connected to the internal combustion engine and to the electric machines. The system comprises a means of determining the speed of the electric machines, a means of determining the conditions for activating a limitation of the rotational speed of the electric machines, and a means of regulating the torque of the electric machines.

The control system may be connected to the electric machines by a first data link, the means of determining the speed of the electric machines potentially being able to determine a limit speed of the electric machines equal to the maximum value of the rotational speeds of the left and right electric machines which are transmitted by the first data link over a predetermined period of time.

The control system may be connected to a means of controlling the braking system of the vehicle by a second data link,
 the means of determining the speed of the electric machines potentially comprising a means of recalculating the speeds of the electric machines which is able to recalculate the speed of each of the electric machines from the measurements of the rotational speeds of the right and left wheels of the second axle set which are transmitted by the second data link, if the rotational speeds of the electric machines are not transmitted by the first data link.

The means of determining the conditions for activating the limitation of speed may comprise a means for the memory-storage of a first speed threshold and a means for the memory-storage of a second speed threshold higher than the first threshold.

The control system may comprise a first comparator comparing the speed of the electric machines to the first speed threshold and a means of regulating the maximum torque of the electric machines on the basis of the signal from the first comparator comparing the speeds of the electric machines.

The control system may comprise a second comparator comparing the speed of the electric machines to the second speed threshold and a means for imposing a zero maximum torque instruction on the electric machines on the basis of the signal from the second comparator.

BRIEF DESCRIPTION OF THE DRAWINGS

Other objectives, features and advantages will become apparent from reading the following description given solely by way of nonlimiting example and made with reference to the attached drawings in which.

DETAILED DESCRIPTION

Figure 1:
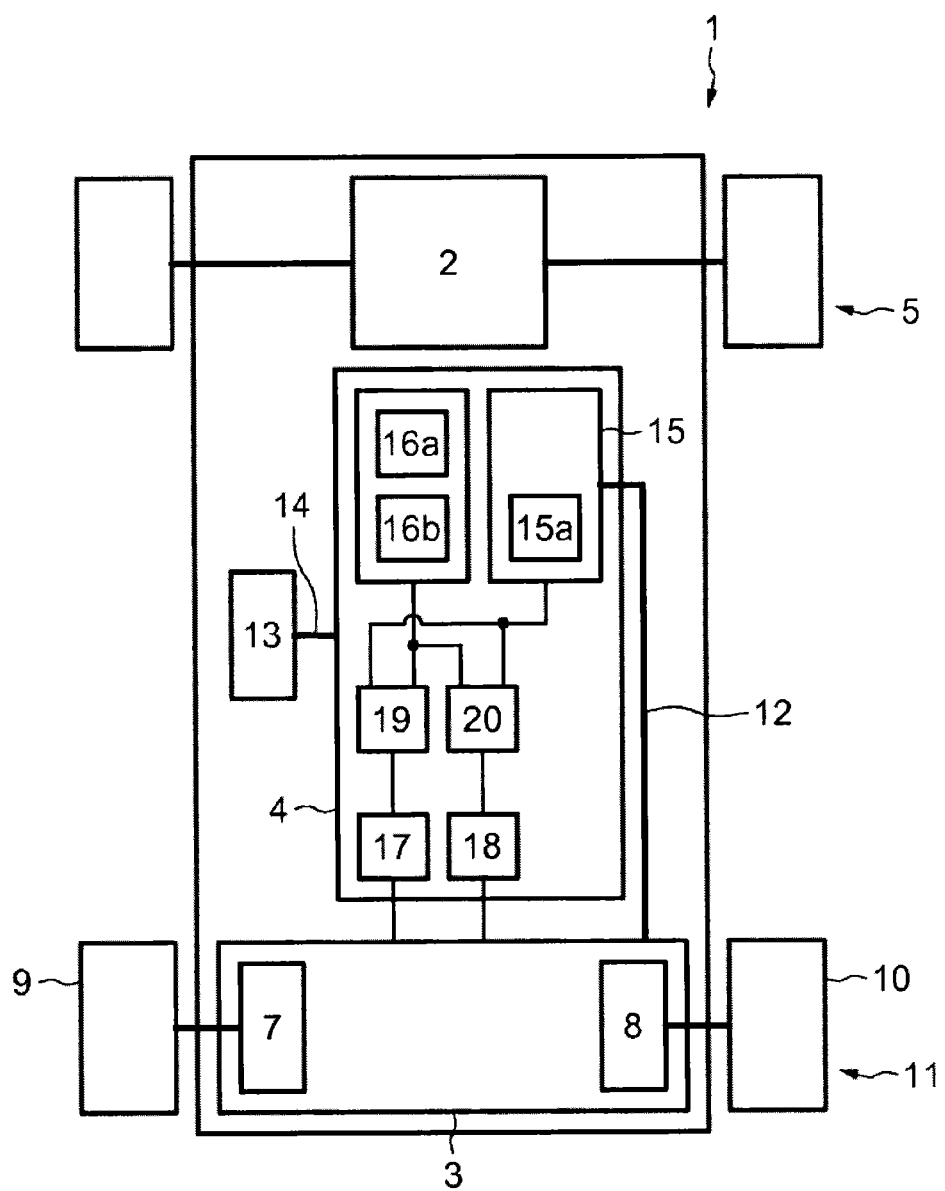
FIG. 1 illustrates the main elements of a system for controlling the electric machines of a hybrid vehicle.

FIG. 1 illustrates the control system 4 for the electric machines 7,8 of a hybrid vehicle 1 also equipped with an internal combustion engine 2. The electric machines 7,8 are each coupled to a wheel 9,10 of the rear axle set 11, the electric machines 7,8 being independent of one another. The control system 4 is particularly well suited to the control of the electric machines 7,8 when the internal combustion engine 2 is in operation.

The control system 4 is connected to the electric traction system 3 comprising the two electric machines 7,8 by a CAN (Controller Area Network) link referred to as the first data link 12 notably allowing the rotational speed of each of the electric machines 7,8 to be transmitted.

The control system 4 also communicates with a means of controlling the braking system 13 via another CAN link referred to as the second data link 14. The rotational speed of each of the right rear and left rear wheels is transmitted to the control system 4 by the second data link 14.

The control system 4 comprises a means 15 of determining the speed of the electric machines which is connected at output to a means 16 of determining conditions for activating a limitation on the rotational speed of the electric machines, this itself being connected at output to a means 17 of regulating the torque of the electric machines and to a means 18 for imposing a zero maximum torque on the electric machines.

The means 15 of determining the speed of the electric machines is connected at input by the first data link 12 to sensors sensing the speed of the rear wheels 9,10 and sensing the speed the electric machines 7,8. The means 15 of determining the speed of the electric machines comprises a means 15a of recalculating the speeds of the electric machines on the basis of the rotational speed of the rear wheels.

The means 16 of determining conditions for activating a limitation on the rotational speed of the electric machines comprises a means 16a for the memory-storage of a first speed threshold and a means 16b for the memory-storage of a second speed threshold.

A first comparator 19 is connected at input to the means 15 of determining the speed of the electric machines and to the means 16a for the memory-storage of a first speed threshold.

A second comparator 20 is connected at input to the means 15 of determining the speed of the electric machines and to the means 16b for the memory-storage of a second speed threshold.

The means 17 of regulating the torque of the electric machines is connected at input to the first comparator 19 and at output to each of the electric machines 7,8.

The means 18 for imposing a zero maximum torque on the electric machines is connected at input to the second comparator 20, and at output to each of the electric machines 7,8.

The control method comprises steps during which the speed of the electric machines 7,8 is determined on the basis of the rotational speed of each of the rear wheels 9,10 and of the rotational speed of each of the rear electric machines 7,8, the speeds of the electric machines 7,8 are compared against thresholds so as, if necessary, to limit or cancel the torque of the electric machines 7,8.

Figure 2:
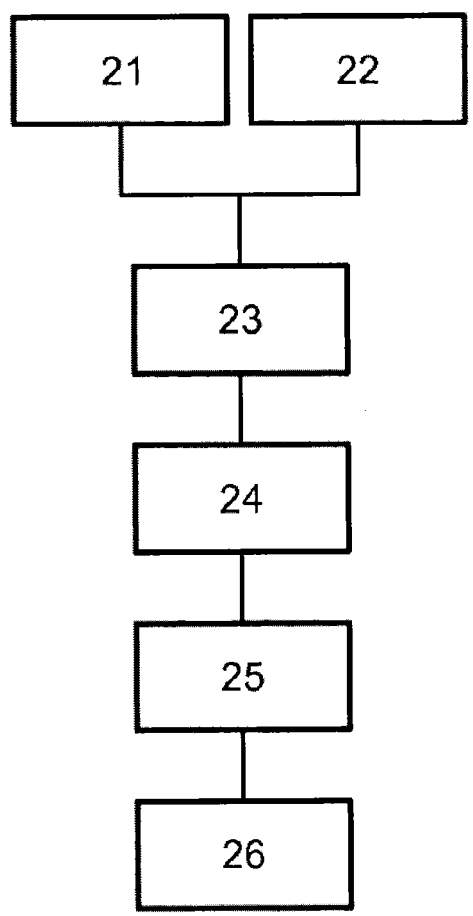
FIG. 2 illustrates the main steps in the method for controlling the electric machines of a hybrid vehicle.

These various steps are described in greater detail hereinbelow with reference to FIG. 2.

During a first step 21, the speed of the electric machines 7,8 is determined on the basis of rotational speed signals transmitted by the electric machines 7,8 via the first data link 12 over a predetermined period of time, for example 10 milliseconds.

Alternatively, if the rotational speeds of the electric machines 7,8 cannot be determined on the basis of the signals transmitted by the first data link 12 for various reasons (sensors defective, malfunctioning of the first data link 12, failure of the entire electric traction system, etc.), then in a second step 22, the speed of the electric machines 7,8 (right and left) is recalculated from measurements of the rotational speeds of the wheels (right and left) of the second axle set, which measurements are transmitted by the second data link 14. This calculation can be performed by multiplying the speed of each of the wheels by a factor corresponding to the step-down ratio of the gears connecting each wheel to its electric motor.

During normal operation, it is therefore possible to know the speed of the electric machines 7,8 and to limit the rotational speed of the wheels under all conditions of operation, even when a wheel is skidding or no longer touching the ground. It is also possible to ensure the limitation upon partial or complete malfunctioning of the electric traction system, through the agency of recalculating then unavailable values.

During a third step 23, it is determined whether the rotational speed of the electric machines 7,8 is above a first stored speed threshold. If it is, then during a fourth step 24, the torque of all the electric machines 7,8 is regulated to below a maximum torque thus enabling the rotational speed thereof to be limited.

That makes it possible to limit the traction torque (and therefore the speed of the machines) while at the same time ensuring continuity of torque (and therefore quality drivability).

During a fifth step 25, it is determined whether the rotational speed of the electric machines 7,8 is above a stored second threshold. If it is, then during a sixth step 26, a zero maximum torque instruction is issued to the electric machines 7,8.

That allows the wheels to be forced to a zero torque in order to be certain of dropping the speed of the electric machines 7,8.

The control method and system 4 thus make it possible to limit the rotational speed of the electric machines 7,8 in order to prevent them from becoming damaged under the effect of traction forces imposed by the internal combustion engine 2.

The invention claimed is:
1. A method for controlling a motor vehicle comprising an internal combustion engine coupled to a first axle set and having at least two electric machines each coupled to one wheel of a second axle set, the method comprising:

determining the speed of at least one of the electric machines;

comparing the determined speed against a threshold; and altering, if the determined speed is above said threshold, the maximum torque of the electric machines so as to limit the rotational speed of said machines.

2. The control method as claimed in claim 1, in which the speed of the electric machines is determined from the maximum value of the rotational speeds of left and right electric machines over a predetermined period of time.

3. The control method as claimed in claim 2, in which the speed of the electric machines is determined from measurements of the rotational speeds of the left and right wheels of the second axle set and from the maximum value of the rotational speeds of left and right wheels over a predetermined period of time.

4. The control method as claimed in claim 1, further comprising:

determining whether the rotational speed of the electric machines is above a first speed threshold, if the rotational speed of the electric machines is above the first speed threshold, the maximum torque of the electric machines is regulated in order to limit their rotational speed, and, if the rotational speed of the electric machines is above a second speed threshold higher than the first threshold, a zero maximum torque instruction is issued to the electric machines.

5. The control method as claimed in claim 1, in which the first axle set is the front axle set, the second axle set being the rear axle set.

6. A system for controlling a motor vehicle comprising an internal combustion engine coupled to a first axle set and at least two electric machines each coupled to one wheel of the second axle set, the control system being connected to the internal combustion engine and to the electric machines, the system comprising:

a means of determining the speed of the electric machines, a means of determining the conditions for activating a limitation of the rotational speed of the electric machines, and a means of regulating the torque of the electric machines.

7. The control system as claimed in claim 6, in which the control system is connected to the electric machines by a first data link, the means of determining the speed of the electric machines being able to determine a limit speed of the electric machines equal to the maximum value of the rotational speeds of left and right electric machines which are transmitted by the first data link over a predetermined period of time.

8. The control system as claimed in claim 6, in which the control system is connected to a means of controlling a braking system of the vehicle by a second data link, the means of determining the speed of the electric machines comprising a means of recalculating the speeds of the electric machines which is able to recalculate the speed of each of the electric machines from the measurements of the rotational speeds of the right and left wheels of the second axle set which are transmitted by the second data link, if the rotational speeds of the electric machines are not transmitted by the first data link.

9. The control system as claimed in claim 6, in which the means of determining the conditions for activating the limitation of speed comprises a non-transitory means for a memory-storage of a first speed threshold and a non-transitory means for the memory-storage of a second speed threshold higher than the first threshold.

10. The control system as claimed in claim 9, comprising a first comparator comparing the speed of the electric machines to the first speed threshold and a means of regulating the maximum torque of the electric machines on the basis of the signal from the first comparator comparing the speeds of the electric machines.

11. The control system as claimed in claim 9, comprising a second comparator comparing the speed of the electric machines to the second speed threshold and a means for imposing a zero maximum torque instruction on the electric machines on the basis of the signal from the second comparator.

* * * * *